US012654382B2

(12) United States Patent
Cacciatore et al.

(10) Patent No.: US 12,654,382 B2
(45) **Date of Patent: *Jun. 16, 2026**

(54) PROCESS FOR MAKING A NON-FIBROUS WATER SOLUBLE PRODUCT

(71) Applicant: The Procter & Gamble Company, Cincinnati, OH (US)

(72) Inventors: Justin Thomas Cacciatore, Cincinnati, OH (US); Jordan David Wellbaum, Union, KY (US); Zachary John Gilbert, Cincinnati, OH (US); Alexander Michael Fry, Liberty Township, OH (US); Mark Robert Sivik, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,199

(22) Filed: Dec. 1, 2023

(65) Prior Publication Data

US 2024/0198575 A1 Jun. 20, 2024

Related U.S. Application Data

(60) Provisional application No. 63/429,582, filed on Dec. 2, 2022.

(51) Int. Cl.
*B29C 48/04* (2019.01)

(52) U.S. Cl.
CPC .................................... *B29C 48/04* (2019.02)

(58) Field of Classification Search
None
See application file for complete search history.

(56) References Cited

U.S. PATENT DOCUMENTS

| | | | | |
|---|---|---|---|---|
| 2,951,514 | A | 9/1960 | Flack | |
| 10,683,618 | B2 | 6/2020 | Pratt et al. | |
| 2014/0008024 | A1 | 1/2014 | Ogasawara | |
| 2016/0175169 | A1 | 6/2016 | Bianchi et al. | |
| 2016/0340068 | A1* | 11/2016 | Brandt Sanz ........ | C11D 17/042 |
| 2017/0368580 | A1 | 12/2017 | Brandt Sanz et al. | |
| 2018/0216053 | A1 | 8/2018 | Denome | |
| 2019/0234023 | A1 | 8/2019 | Pratt et al. | |
| 2020/0093711 | A1 | 3/2020 | Hamersky et al. | |
| 2021/0393533 | A1* | 12/2021 | Beach-Herrera .... | A61K 9/2095 |
| 2022/0119744 | A1 | 4/2022 | Sivik et al. | |
| 2024/0182652 | A1* | 6/2024 | Cacciatore ........... | C11D 17/042 |

FOREIGN PATENT DOCUMENTS

| | | | |
|---|---|---|---|
| GB | 779396 | A | 7/1957 |
| GB | 2469108 | A | 10/2010 |

OTHER PUBLICATIONS

All Office Actions; U.S. Appl. No. 18/526,188, filed Dec. 1, 2023.

(Continued)

*Primary Examiner* — Michael P. Rodriguez
(74) *Attorney, Agent, or Firm* — James E. Oehlenschlager; Carrie Schwartz

(57) ABSTRACT

Included herein are manufacturing methods relating to water soluble non-fibrous substrates with particles and an apparatus to place the particles on the water soluble non-fibrous substrate.

19 Claims, 12 Drawing Sheets

(56) References Cited

OTHER PUBLICATIONS

All Office Actions; U.S. Appl. No. 18/526,191, filed Dec. 1, 2023.
Unpublished U.S. Appl. No. 18/526,188, filed Dec. 1, 2023, to Justin Thomas Cacciatore et. al.
Unpublished U.S. Appl. No. 18/526,191, filed Dec. 1, 2023, to Justin Thomas Cacciatore et. al.
PCT Search Report and Written Opinion for PCT/US2023/081985 dated Apr. 9, 2024, 11 pages.

* cited by examiner

PROCESS FOR MAKING A NON-FIBROUS WATER SOLUBLE PRODUCT

FIELD OF THE INVENTION

Processes for making non-fibrous water soluble products utilizing a discretizing element.

BACKGROUND OF THE INVENTION

Non-fibrous water-soluble products are highly desired by consumers. These non-fibrous water-soluble products allow ease of use in that the consumer can easily and simply dose the desired amount of product into their desired process. This is much easier compared to having to pour liquid or powder into a process, which can be very difficult to accurately dose the correct amount of active, and for some consumers may also be physically difficult.

The method of manufacturing non-fibrous water-soluble products is complicated with many steps being required to form the non-fibrous water-soluble product and dose the required amount of ingredients, like particles, into the non-fibrous water-soluble product in an efficient and consistent manner.

Typically, a first non-fibrous water-soluble film is formed into a cavity, into which bulk particles, such as a detergent composition, is dosed, and the cavity is sealed by a second non-fibrous water-soluble film. The process of dosing particles into the cavity can be inefficient and controlling the consistency of the chemistry that is dosed into the cavity can be challenging. This is especially problematic for those ingredients, such as enzymes, that are typically present at only very low levels in the detergent composition.

Thus, there is a continuing unmet need for a process to make non-fibrous water-soluble unit dose products with particles in an efficient manner.

SUMMARY OF THE INVENTION

The present application includes a method of manufacturing a water soluble product comprising particles, comprising: a) providing a first continuous water soluble non-fibrous substrate comprising a first side moving in a first direction, b) providing a discretizing unit comprising one or more pockets, wherein the one or more pockets have an ingress and an egress, c) providing a first feed of first particles to the ingress of at least one of the one or more pockets; d) delivering the first particles from the egress of the one or more pockets of the discretizing unit onto at least a portion of the first side of the first continuous water soluble non-fibrous substrate; e) at least partially covering the first side of the first continuous water soluble non-fibrous substrate with a covering.

The present application also includes a method of manufacturing a water soluble product comprising particles, comprising: a) providing a first continuous water soluble non-fibrous substrate moving in a first direction, b) providing a discretizing unit comprising one or more pockets, wherein the one or more pockets have an ingress and an egress, c) providing a feed of first particles to the ingress of at least one of the one or more pockets; d) delivering the first particles from the egress of the one or more pockets of the discretizing unit onto a portion of a first side of the first continuous water soluble non-fibrous substrate; wherein the at least one of the one or more pockets receiving the first particles is nested with an adjacent pocket while receiving the first particles.

These and other iterations will be described more fully below.

DETAILED DESCRIPTION OF THE INVENTION

Figure 1:
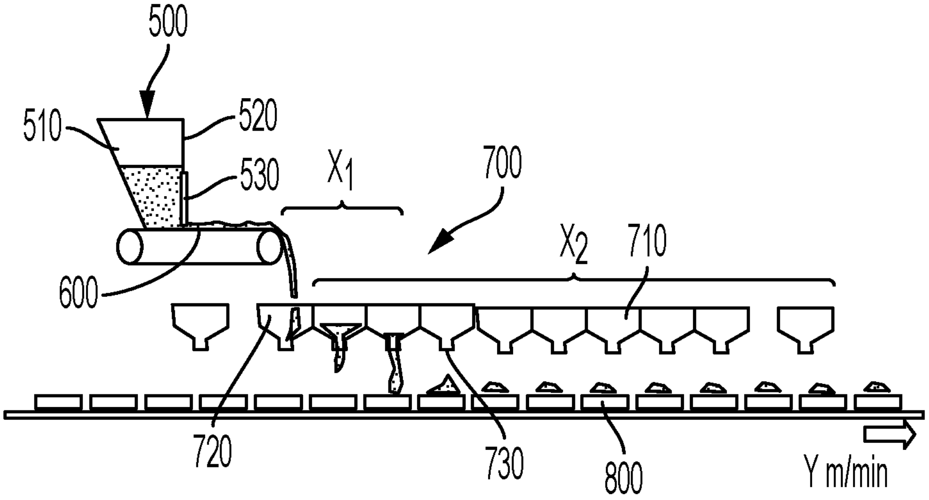
FIG. 1 is a representation of an apparatus for depositing discretized particle doses on a substrate.

Manufacturing a non-fibrous water soluble product can be a delicate balancing of materials and processing to achieve the desired end product, functionality, performance, and meet the economic requirements for mass production. Previous methods for manufacturing non-fibrous water soluble products with particles included the incorporation of small amounts of particles directly into the substrate by, for example, incorporating particles into the substrate during the substrate making process, or spraying the particles onto a completed substrate. These methods, however, have some disadvantages. When incorporating particles into the substrate during manufacturing of the substrate, the particles can interfere with the capture and entangling process of making the substrate. This can lead to insufficient or uncontrolled dissolution of the substrate and/or the inability to actually form a substrate. These issues greatly limit the types and properties of particles that can be added in this type of process. These particle properties which can be limiting can include particle size, particle size distribution, chemical composition, particle surface properties (like adhesion and cohesion), particle stability within the substrate making process, difficulty in segregating incompatible particles, etc.

This method of addition can also add cost to the manufacturing process as it can require the solubilization of solid ingredients to add them to the substrate. Another drawback is that it is difficult to control where the particles are added to the substrate and this can create issues with sealing when particles get on the areas of the substrate to be sealed.

Despite the difficulties with known manufacturing methods, there is still a desire to be able to load larger amounts of particles, different types of particles, control where the particles are located within the non-fibrous water soluble product, and to do so in an economically feasible way. This allows for greater product flexibility. A review of possible solutions in the industry for unit dose applicators did not identify an intermittent particle applicator that could meet the base requirements of: frequency of dose, individual dose mass (mass flow), dosing footprint, and manufacturing flexibility within practical limits. For example, application of auger-based intermittent particle fillers are typically limited to an operational frequency of 3.33 doses/s—nearly half of the target starting rate of 6 doses/sec. Utilizing such a technology would require substantial capital investment to 'number up' units in series to attempt to hit the 6 doses/s target starting rate.

Another challenge with the addition of particles to a non-fibrous water soluble product is in the manufacturing of a non-fibrous water soluble product. For example, one way of making a non-fibrous water soluble product is with a continuous substrate. This continuous substrate, however, is being utilized to make discrete products. This means even though the substrate is continuous, the particles need to be applied intermittently to create the discrete products. To create the discrete products on a continuous substrate, the particles need to be delivered to the substrate in such a way that they stay predominantly in a defined area, i.e. a target area. Other devices which deliver particles, like rotary feeders, are generally designed for bulk flow control and not to create a uniform discretized dose. Without a controlled delivery of the particles, this can lead to variable amounts of particles from product to product or failure to form a discrete product due to particles being located in regions needed for scaling.

A further challenge in controlling particle delivery to a substrate is seen where the substrate is moving. This requires coordination between the delivery of the particles to the substrate and the positioning of the substrate with the delivery mechanism. For unit dose applications, intermittency of dosing is phased with the position of the yet-to-be cut non-fibrous substrate product position on the substrate to form discrete units. Thus, the timing of the particle dose delivery and movement of the substrate need to be coordinated to allow for formation of the discrete units.

Moreover, the movement of a substrate during and after particle application can exacerbate attempts to deliver particles to the desired portion of the substrate as particles can roll and/or splash as they land on a moving substrate or as they continue moving with the substrate to finish the manufacturing process. In addition, failure to control the footprint of particles deposited on a substrate can result in some of the particles flowing into the area used for sealing the substrate to create the non-fibrous water soluble product. While a small amount of particles in this area can be tolerated, too many particles in this area can interfere with the seal and can cause product failure or failure to form a product. Ideally these issues are controlled through manufacturing conditions without the need for the addition of corrective steps, like vacuuming to remove loose particles, to allow for the more cost effective and speedy production of the product.

When looking for a solution, the inventors were interested in finding something that could be utilized for intermittent particle delivery with the ability to precisely control the deposition of particles into a target region of the substrate. In addition, there was a desire to be able to accommodate many different types of particles, not just those that were free flowing. There was also a desire for the process to be less sensitive to changes in the manufacturing rates and changes to the product dimensions. This process solution is referred to as a travelling mask.

Generally, in a travelling mask process, a continuous feed of particles is supplied which is separated into discretized doses through the use of a discretizing unit with pockets (explained in more detail below). The primary speed limiter for the travelling mask is gravity, as gravity is the primary force used for particle deposition onto a substrate, though other forces could be used.

Specifically, the rate at which gravity can pull particles through a discretizing unit pocket and onto a moving or static substrate is a limiter. Given a particular pocket design and particle type, the time it takes for a particle to travel through a discretizing unit pocket and onto a substrate to is relatively fixed. As one seeks to speed up a production process, this time could become a system limiter due to the physics of particle flow. However, the travelling mask concept allows for one to account for this fixed time component without fundamentally influencing the other parameters of the system. All one has to do is increase the residence time in which a given pocket is in proper alignment with a substrate. In a linear production process, this costs machine direction distance, which is relatively minor.

The travelling mask concept, through the design of the feeding system and the discretizing unit, also allows for the accommodation of a broader range of particles. By manipulating certain properties the system can accommodate for particles which exhibit various flow characteristics, from cohesive to free flowing. This can largely be done while still maintaining the independence of three jobs done in the system (discretizing, controlling particle flow, and controlling particle laydown).

Given the ability to independently control the exit design out of the pocket through both the pocket itself (ex: shape, egress placement, baffles, etc.), and the design of the system (ex. height from the pocket egress to the top of the substrate) one can essentially design in a rapid ability to meet changing finished product requirements. For example, today, a water soluble non-fibrous product may have a size of about 76×76 mm, should the form be compacted to a 60×60 mm area— the particles would need to be applied in a smaller footprint. This could be accomplished by, for example, a singular design change to the outlet of the pocket, while keeping all other design aspects fixed.

Further, the travelling mask operation is fairly insensitive to substrate type, though substrate type can play a role in the footprint of the particles. So, properties of the target substrate can be taken into consideration when designing the travelling mask. For example, the coefficient of restitution between the particles and the substrate can vary depending on properties of the substrate. The travelling mask system, however, can be optimized to counteract and/or work with these types of properties. Moreover, a substrate may be modified to help with particle lay down and/or distribution. For example, a substrate may be at least partially coated with a material to help particles stick to a substrate and/or to minimize particle bounce upon application to a substrate. This can include any material which would make the substrate itself sticky, like water or any material which will partially wet the particles making the particles themselves sticky. These materials could be, for example, other liquid actives, like perfume, silicone (ex. antifoam), etc. This substance could also be, for example, an adhesive. Suitable adhesives can be found in "Viscoelastic Windows of Pressure-Sensitive Adhesives", E. P. Chang, *J. Adhesion* 34 (1991) 189-200. These materials can be applied to the substrate, for example, through atomization. This can be in a pattern or random. In addition, a vacuum can be applied to the substrate to help pull particles onto the substrate and/or hold them in place.

Thus, what the inventors have found is a process that decouples discretizing a continuous feed of particles into individual doses, controls the mass and/or volumetric flow rate of particles, and controls the laydown of particles onto a substrate.

Apparatus

An apparatus for use with a travelling mask process can include, for example, a feeding system and a discretizing unit. Generally speaking, a feeding system can be used to control mass and/or volumetric flow of particles. Another job the feeding system can do, if needed, is spread the particles in the cross direction ("CD"). A discretizing unit, on the other hand, takes the feed of particles and converts it into individual doses of particles.

A feeding system 300 can comprise, for example, a feeder 505, a conveyance apparatus 400, or a combination thereof. A discretizing unit may comprise a conveyor system, one or more pockets, a guard, or any combination thereof. The apparatus may include multiple feeding systems and/or parts of a feeding system as well as multiple discretizing units and/or parts of a discretizing unit. The distance from the particle exit of a feeding system (like from a conveyance apparatus or a particle feeder) to the ingress of the discretizing unit may be from about 0 to about 1.0 m, for example.

Where a traveling mask system is utilized to deposit particles onto a substrate, the substrate may be provided, for example, in the form of a roll. The substrate may be fed into the traveling mask system in order to receive particles and/or be made into a water soluble unit dose containing the particles. For example, the roll of substrate may be fed into the system for delivering particles utilizing a roller, a belt, a conveyor, or any combination thereof. In addition, a substrate may be fed into the system and/or run through the system under tension. Tension may be set, for example, through the use of a vacuum conveyor.

Feeding System

Figure 10:
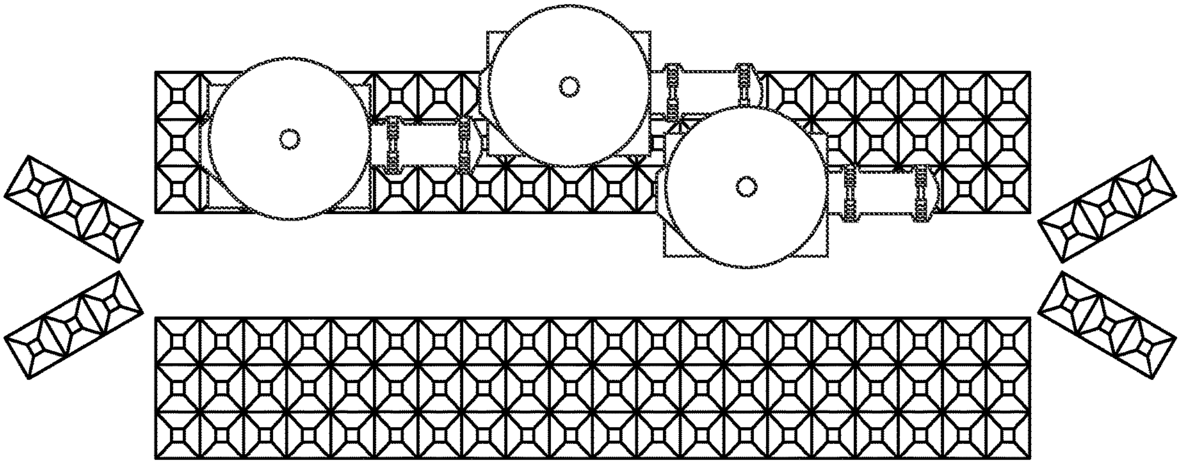
FIG. 10 is a top down view of a unit for depositing particles onto a substrate utilizing multiple feeding systems in an inline configuration.
Figure 11:
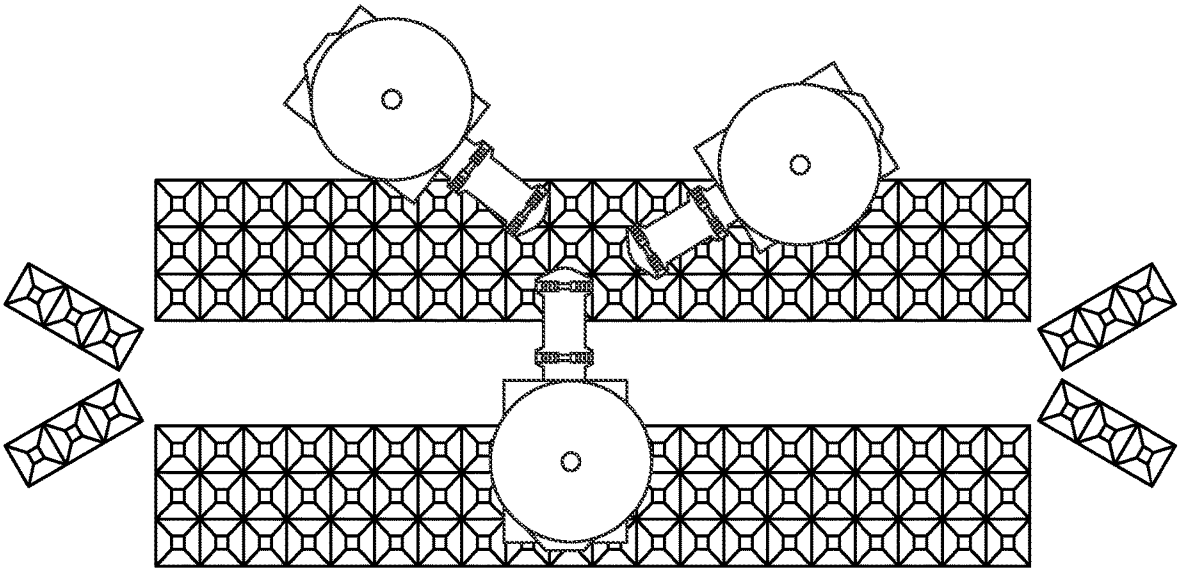
FIG. 11 is a top down view of a unit for depositing particles onto a substrate utilizing multiple feeding systems in a radial configuration.

A feeding system can include a feeder and/or a conveyance apparatus (see FIG. 1). A feeding system 300 can comprise one or more feeders 505 and one or more conveyance apparatus 400. The feeders and conveyance apparatus can be in the same or different configurations. For example, feeders and/or conveyance apparatus can be put in line to allow for particles to be added to the same pocket or different pockets in a discretizing unit (ex. FIG. 10). In addition, multiple feeders and/or conveyance apparatus may provide the same particles or different particles. Feeders and/or conveyance apparatus may also be put in a radial configuration where they may be delivering the same or different particles (ex. FIG. 11). A feeding system may also be configured such that one is providing a first feed of particles and a second is providing a second feed of particles. The first and second feed of particles may be deposited on the same or different substrates. In addition, the first and second feed of particles may be to the same or different pockets. The first and second feeds of particles may be compositionally the same or different.

A conveyance apparatus 400, when utilized, conveys particles from a feeder 505 to a discretizing unit 700. The conveying function of the conveyance apparatus may be passive or active depending upon the system set-up. A conveyance apparatus 400 can include, for example, a belt, a slide, a trough, a tray, or a combination thereof. The conveyance apparatus may be static or in motion. When in motion, the motion can be rotary, reciprocating, oscillating, translational, vibratory, etc.

One example of a feeder in a feeding system is a hopper. A hopper 500 can hold the particles for application onto a substrate. A hopper 500 may be any appropriate shape. For example, a hopper may have one vertical wall which is straight up and down and another vertical wall which is slanted, as can be seen in FIG. 1. In FIG. 1, the back wall 510 of the hopper 500 is slanted toward the front wall 520. The back wall may be slanted at an angle of, for example, about 60 degrees or more from the horizontal. Having a slant in the back wall helps prevent particle back-up in the hopper and helps to prevent clogging.

The front wall 520 of the hopper 500 may contain an opening. The opening may be, for example, a vertical slot 530 or a horizontal slot (not pictured). The vertical slot and horizontal slot may have dimensions as befit the particle and manufacturing settings. The slot has dimensions and its cross sectional area can act as an extrusion process. Knowing the area ($m^2$), the belt speed (m/s), and the particle density one can approximate the volumetric flow ($m^3$/s) and mass flow. Thus, the height and width of the slot may be tuned for optimal particle and manufacturing options.

The slots may be any suitable shape. The most common shape is a rectangle. A horizontal slot may be, for example, from about 20 mm to about 500 mm in the CD, or about 25 mm in the CD, with an adjustable height.

The hopper may be part of a more complex feeder, like that of a point source feeder or a broad front particle feeder. In these more complex feeders, the hopper can act like a particle repository while another portion of the feeder moves the particles out of the hopper. These can include things like a screw feeder, a belt, or a combination thereof. Some examples of more complex feeders with a hopper can include, for example, a point source feeder and a broad front feeder. Feeders may use motion, like vibration and/or friction, to move particles out of a hopper and/or a combination of mechanics and motion.

Point source feeders and broad front feeders either alone, or in combination with other components of a feeding system can distribute particles across the CD. This particle profile could cover the majority of the CD length of one or more pockets or could be partitioned/segmented to create individual particle streams into individual discretizing units. Spreading a particle stream in a CD can, for example, allow for more than one particle feeder to be situated side-by-side and thus have more capacity for manufacturing.

Figure 3:
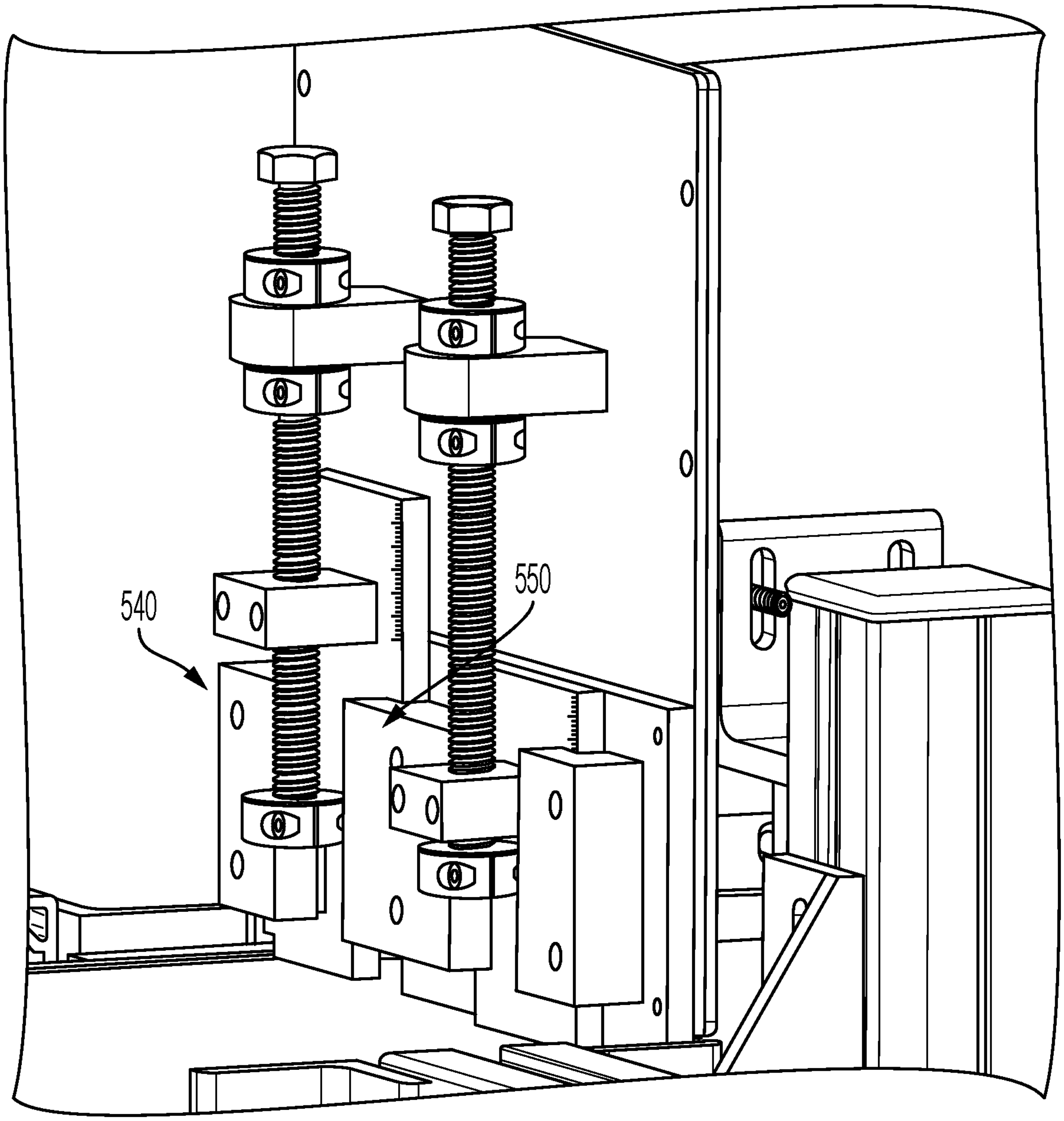
FIG. 3 is a schematic representation of a weir system on a hopper.

A feeder can provide particles onto a conveyance apparatus 400, or directly into a discretizing unit. The egress of the particles from the opening of the hopper 500 may be controlled, for example, with a weir 540. A weir 540 is a dam-like device that can be used to adjust the amount of particles that can exit from an opening. As can be seen in FIG. 3, a weir 540 can include, for example, a gate 550 which can be adjusted by a mechanism both up and down.

A hopper 500 can be in contact with the belt 600 and/or with a portion of a discretizing unit, like a pocket. The contact can be press fit. A press fit is generally where a hopper or an extension of the hopper like an elastomer blade touches the conveyance apparatus (ex. belt) or a portion of a discretizing unit (ex. pocket) to prevent, or at least minimize leakage and/or spillage of the particles. This allows more control over the particles and where they make egress from a hopper 500.

When a conveyance apparatus is utilized, as the particles exit a feeder, like a hopper 500, they can come into contact with a conveyance apparatus. If the conveyance apparatus is a belt 600, it will generally be moving, preferably in the machine direction. However, the direction of the conveyance apparatus can be adjusted to, for example, something between the machine direction and perpendicular to the machine direction as needed to help deliver particles most efficiently to a discretizing unit. The speed of a conveyor apparatus can also be adjusted.

The particles can travel along a conveyance apparatus, for example a belt 600, to waterfall over the edge of the conveyance apparatus into a discretizing unit 700. Where the convenance apparatus is a belt 600 or similar apparatus, it can make a continuous loop picking up particles from the hopper 500 and delivering them to the discretizing unit 700.

Where a conveyance apparatus is not utilized, the particles exit the feeder and enter a discretizing unit.

Discretizing Unit

A discretizing unit 700 takes a stream of particles from a feeder and/or a conveyance apparatus and separates the particle stream into discrete particle loads. These discrete particle loads can be, for example, about 0.1 g to about 30 g, when looking at a single use consumer product. The size of the discrete particle load can vary greatly depending on the use of the final product. The discretizing unit may be a single unit, multiple units in a line, multiple units side-by-side, or even a combination of units in a line and side-by-side to create an array.

A discretizing unit may comprise a conveyor system, one or more pockets, a guard, or any combination thereof. A discretizing unit or any part thereof may be in motion. For example, a discretizing unit or any part thereof may be moving in the same direction as the belt, the machine direction ("MD") or in the opposing direction. In addition, the discretizing unit or any part thereof may have movement in the vertical direction.

A conveyor system can comprise, for example, a track. One or more pockets may be moveably or statically attached to the track. The conveyor system may be utilized to move one or more pockets attached to the conveyor system. The conveyor system may move one or more pockets in a set pattern, for example, in a loop. A conveyor system may be utilized to move one or more pockets into a location where they can receive particles from a feeder and/or a conveyance apparatus. A conveyance system can also move in a vertical direction allowing it to move closer to or further from a feeder and/or conveyance apparatus for receipt of particles into one or more pockets. A conveyance system may also move in a vertical direction to move one or more pockets closer to a substrate for particle deposition. The vertical movement can allow for better control of delivery of particles to both the discretizing unit and to a substrate. For example, a conveyor system may bring one or more pockets close to a feeder or conveyance apparatus when picking up particles and then drop down to bring the one or more pockets to be closer to a target substrate for particle application.

In addition, a discretizing unit or any part of the discretizing unit may contact, for example, a feeder, a belt, a target substrate, or any combination thereof. Contact among these entities can help minimize particle spillage either into or out of a pocket of a discretizing unit or off of a target substrate during particle transfer.

A discretizing unit may comprise a guard. A guard can be utilized, for example, to help guide particles into a pocket and/or out of a pocket and onto a substrate, help with dissipation of kinetic energy, splash/bounce protection, and/or laydown control. A guard may come into contact with a feeder, a conveyance apparatus, a substrate, a pocket, or any combination thereof. A guard may be attached to any portion of a discretizing unit, for example, to a pocket. A guard may be affixed to a pocket. The guard may be movably affixed to a pocket. For example, a guard may be in one position while a pocket receives particles and in another position when a pocket deposits particles onto a substrate. A guard may be made of a flexible material, a rigid material, or a combination thereof. For example, a portion of a guard which comes into contact with a feeder, a conveyance apparatus, and/or substrate may be flexible, while the remainder may rigid.

As noted above, a discretizing unit 700 can comprise one or more pockets 710. Each pocket may have a height and a width. The height and/or width of a pocket may be adjustable. Each pocket may receive particles from a single particle stream or multiple particle streams. When from multiple particle streams, the particles may be the same or different. The one or more pockets may have an ingress 720 and an egress 730. The ingress and egress may be different or the same. In addition, the ingress and egress may be of a different size and/or shape. For example, the ingress 720 may be larger than the egress 730. In addition, the ingress may be smaller than the egress. The egress may have a smaller surface area than the ingress. The ingress may have a characteristic length, (ex. diameter, width, etc. depending on the shape of the ingress) for example, about 15 mm to about 150 mm, preferably about 76 mm, and/or a diameter of about 5 mm to about 150 mm.

One or more pockets may be in motion. A pocket may move vertically and/or horizontally. The one or more pockets may move in the machine direction ("MD") or in the opposing direction. The one or more pockets may move in the CD. In addition, any of the one or more pockets may contact, for example, a feeder, a conveyance apparatus, a target substrate, other pockets, or any combination thereof. Contact with these entities can help minimize particle spillage either into or out of a pocket and off of a target substrate.

Pockets may touch one another to minimize or eliminate gaps between two or more adjacent pockets, for example, as shown in FIG. 1. The pockets may fully touch one or more sides or only a portion of one or more sides. This kissing of at least a portion of two or more pockets prevents loss of particles between the pockets, especially while particles are being loaded into one or more pockets.

Figure 12:
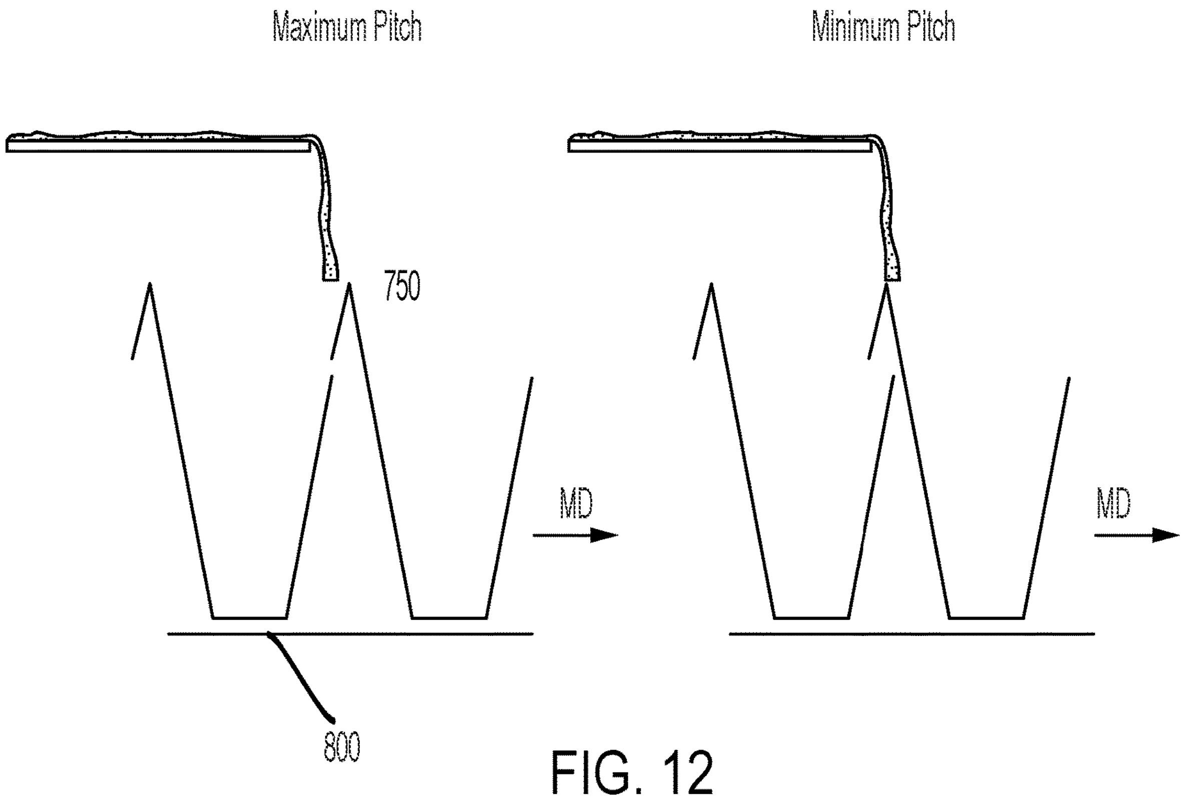
FIG. 12 is a representation of adjacent pockets with flashing in both a minimum pitch and a maximum pitch configuration.

The pockets may be rigid, flexible, or a combination thereof. For example, one or more of the sides of a pocket may have flexible portions that allow for compression and/or shrinking of at least one of the pockets. This compression or shrinking allows for the two pockets to have a smaller pitch (i.e. the distance from the center of one pocket to the center of the adjacent pocket). The ability to adjust this pitch gives manufacturing flexibility to the process. For example, if there is a misalignment of the unit dose and the cutting apparatus, the ability to adjust the pitch of one or more pockets can alleviate and/or minimize this misalignment.

Where the pockets are rigid and they touch during receipt of particles, it is difficult to do any significant adjustment to the pitch. Another way to allow for adjustment of the pitch, even without pocket compression, is through the purposeful design of a gap space between the pockets. As noted above, however, leaving just a gap would allow for many particles to go between the pockets resulting in a wasteful and messy production process. To account for the desire to build in some space between pockets, but allow for minimization of particle spill between two adjacent pockets, a flashing can be used. An example of a flashing 750 on a pocket and how it can be utilized to help adjust pitch can be seen in FIG. 12.

It can also be used to force particles in a given feed stream to self-segregate into one pocket or another. Pockets may touch a feeder, a conveyance apparatus, and/or a substrate. When a pocket contacts a target substrate it can act as a guard to dissipate any kinetic energy left in the particles that could induce the particles to bounce or otherwise move out of their intended laydown zone due to falling from the feeder and/or conveyance apparatus. This execution allows for greater specificity in laydown of particles onto a target substrate. It could even allow for particle printing, where a pattern is made on the target substrate with the particles, with proper design of the egress of a pocket on a discretizing unit (ex. addition of a screen).

An ingress 720 is a portion of a discretizing unit 700 which receives particles, from a feeder and/or a conveyance apparatus. For example, as can be seen in FIG. 1, multiple pockets 710 in the discretizing unit travel under a conveyance apparatus, a belt 600, where particles are received into the one or more pockets 710 through the ingress 720. The ingress may have any acceptable shape. Where it is desired for adjacent pockets to be in contact to minimize particles going between the adjacent pockets, adjacent pockets should have complimentary shapes. Complimentary shapes could include shapes that nest, for example, at least the portions of adjacent pockets that will touch during particle delivery can be flat. The ingress of one or more pockets may be square, rectangular, hexagonal, octagonal, etc.

While it is important to dampen and/or arrest particle motion when applying it to a target substrate, it is also desirable to keep particles in motion up to that point in the process. This is more important with particles with low flowability as particles that slow down too much or come to rest during the movement from a feeder to a pocket have an opportunity to form particle bridges and/or interlocking arches which can clog the feeder, conveyance apparatus, and/or a pocket. A pocket can be designed to help encourage particle flow and/or minimize clogging. This can be done, for example, with the shape of the pocket. A pocket may, for example, have one or more slanted sides. The pockets 710 may have any acceptable shape for particle delivery to a substrate 800. For example, one or more pockets 710 may be in the shape of a funnel, as can be seen in FIG. 1.

One way to encourage flow of particles through a pocket is by designing the slope of one or more walls of the pocket. For example, a slope of about 70° to about 120° from horizontal will help maintain particle flow through a pocket. Egress size can also help. An egress size that is at least 3× that of the maximum particle size of the particles being deposited on the target substrate can help to minimize bridging and/or clogging.

In addition, the interior of the pocket may include design features, like baffles. These design features may be used, for example, to direct particles to the egress, control energy of the particles between the ingress and egress, minimize clogging, etc.

The particles travel through at least one of the one or more pockets 710 to an egress 730 where they exit the one or more pockets 710 and deposit onto a substrate 800. The distance from an egress of a pocket to a substrate may be, for example, from about −50 mm to about 50 mm. The negative value acknowledges when a pocket and/or a guard, and a substrate touch, the substrate can be compressed and go below the plane of the substrate to a negative value. In addition, a negative value represents where an egress of a pocket may dip into a cavity formed in a substrate and also be below the plane of the substrate.

Once the particles are deposited onto a substrate, the substrate may be folded over upon itself to create a cover. A second substrate or multiple substrates can be placed over the particle containing substrate to form a cover. The second substrate or multiple substrates utilized as a cover(s) may, for example, be brought in via its own roller and unwinder. The second or multiple substrates could be traveling along with the substrate onto which particles are deposited and superimposed over the particle containing substrate through, for example, folding boards, idlers, etc.

Once a cover is in place, the cover may be sealed to the particle containing substrate to form a unit dose. The substrates may be sealed by any conventional method, for example, heat sealing. The heat sealer may also act as a way to separate the individual unit doses from the continuous substrate or a separate cutting step may be utilized. Where utilized, a separate cutting step may include a die cutter.

In addition to the apparatus described above with respect to the traveling mask process, addition apparatus can be used to either start and/or finish the manufacturing of the final product. For example, addition apparatus can include that utilized for transporting substrate from a roll through the traveling mask process and packaging the formed unit dose articles.

Manufacturing Process

Figure 4:
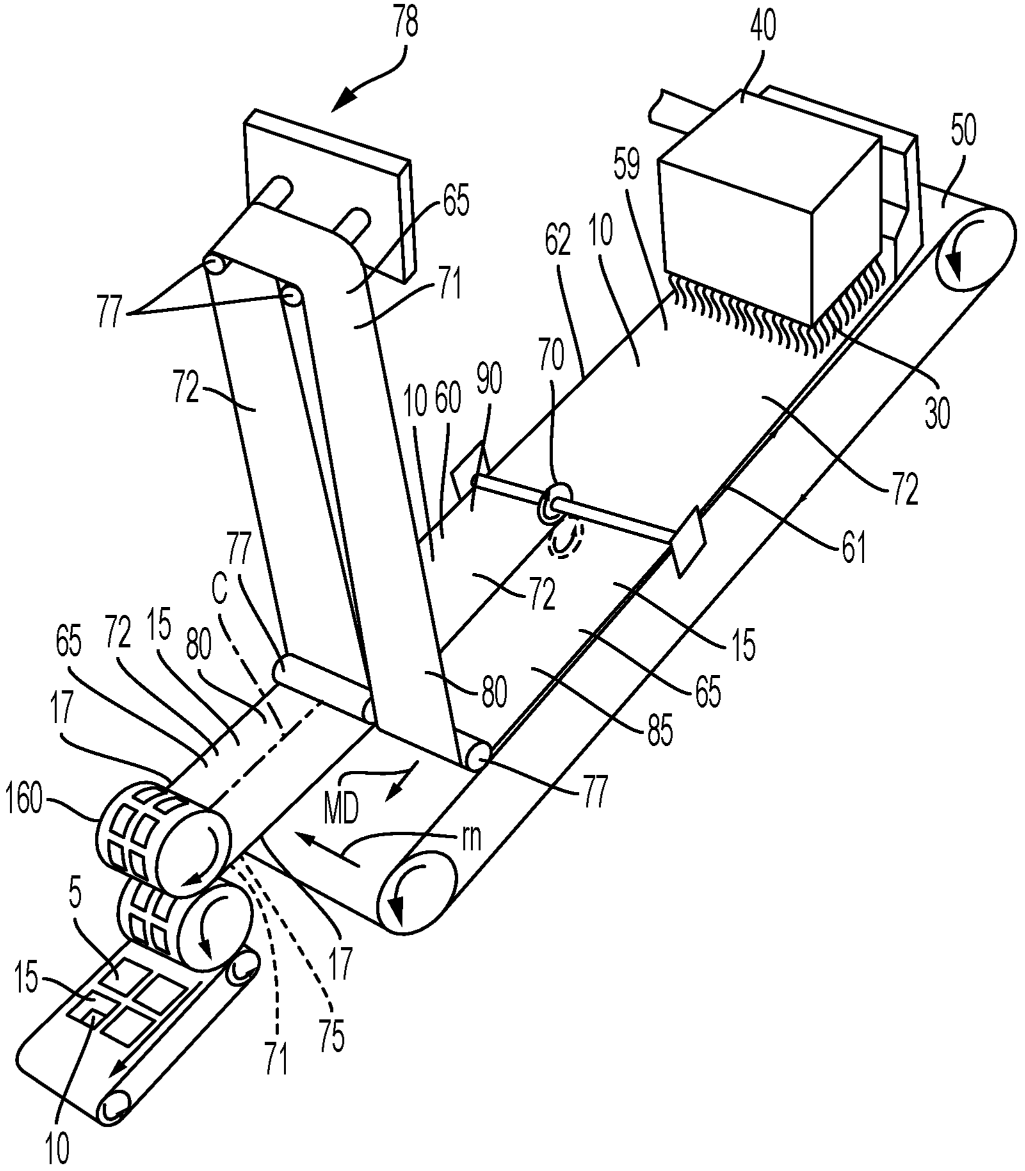
FIG. 4 is a schematic representation of a process for a single substrate being formed into multiple substrates.

A process for making a non-fibrous water soluble product can first include making a non-fibrous water soluble substrate. The substrate may be continuous or discontinuous. Once a substrate is formed, it may be provided to the process. A single substrate may be provided, multiple substrates, or even a parent substrate that is cut into multiple substrates during the manufacturing process. An example of a single substrate being formed into multiple substrates can be seen in FIG. 4. In FIG. 4, a parent continuous substrate 59 can be formed on a die block assembly 40 and then cut in the machine direction MD by a knife 70, for instance a rotary cutting knife that cuts in the machine direction MD, forming first 60 and second 65 continuous substrates. Cutting a second substrate from the parent continuous ply substrate 59 can be practical for providing better manufacturing quality control.

In line with an apparatus as described above, a process for manufacturing a unit dosc product, like a water soluble non-fibrous product, can comprise providing one or more substrates (ex. first water soluble non-fibrous substrate), either in a continuous or discontinuous fashion to a traveling mask system. Illustrations of exemplary processes for utilizing both continuous and discrete substrates can be seen in FIGS. 1 and 2. This substrate(s) (ex. water soluble non-fibrous substrate) may be provided in the form of a roll or any other suitable known method. The substrate(s) (ex. first water soluble non-fibrous substrate) may be fed into the traveling mask system to receive particles on the substrate(s), for example on a first side of the substrate (ex. water soluble non-fibrous substrate). Substrates may be fed into the traveling mask system for receiving particles utilizing a roller, a belt, a conveyor, or any combination thereof. In addition, substrates may be fed into the system and/or run through the system under tension. Tension may be set, for example, through the use of a vacuum conveyor.

Substrates fed into a traveling mask system may be continuously moving, discontinuously moving, or a combination thereof. Substrates may be moving in a first direction, for example, in the machine direction. Substrates may also move in a cross direction. Substrates may be moving at a rate of about 5 m/min to about 100 m/min, for example. The direction of the movement of the substrate(s) can be determined based on, for example, the footprint of the space in which the manufacturing process will be run and/or what is needed to run the process most efficiently.

A substrate can enter a traveling mask system adjacent to, for example, a feeding system, a discretizing unit, or a combination thereof. Particles are delivered to a feeding system, for example, to a hopper. Generally, particles are fed to a feeding system by, for example, a belt, chute, etc. Particles generally enter the feeding system into a feeder. Particles move from a feeder ingress, where the feeder receives the particles, to a feeder egress, where particles exit a feeder. This movement of the particles in a feeder can be passive, for example through the use of gravity, or active through the use of a mechanism and/or motion (ex. vibration). Once the particles move to the egress of the feeder, they can be dispensed directly into a discretizing unit for application onto a substrate or they can be dispensed onto another part of a feeding system, like a conveyance apparatus. A feeder can control (i.e. meter) the rate at which particles exit the feeder and/or the rate at which they are delivered to the next stage (ex. discretizing unit or a conveyance apparatus). One way of controlling this rate is through the use of a structure, like a weir, discussed above.

Where a conveyance apparatus is utilized, it also moves particles from one portion of itself, where the particles are received, to another part, where the particles are dispensed. This conveyance apparatus can control the rate at which the particles are moved from one portion to another. It may also control the rate at which particles are dispensed from it into a discretizing unit. Moreover, a feeder and an intermediate structure, like a conveyance apparatus, may work in concert to control the rate at which particles are transferred into a discretizing unit. Particles dispensed from a feeder and from an intermediate structure can be done at a consistent rate or at a variable rate as needed to meet the demands of the manufacturing process. This control can be either passive or active. Particles can exit a conveyance apparatus and enter a discretizing unit. The flow of particles from a feeder system to a discretizing unit can be continuous or discontinuous.

In one example, a feeder system comprises a vibratory feeder (i.e. feeder) and a trough (i.e. conveyance apparatus). Particles are fed into the vibratory feeder which deposits particles into the trough. The vibratory motion of the feeder moves the particles along the trough where they reach the end. At this point, the particles make their way to the discretizing unit. This can be done through gravity, for example, where particles cascade over the end of the trough and descend toward a discretizing unit.

Figure 7:
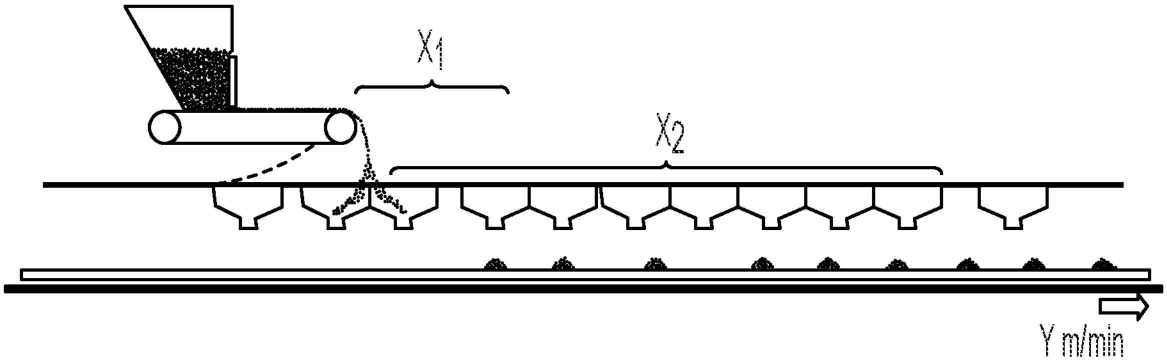
FIG. 7 is a schematic representation of a process of making a water soluble product where two adjacent pockets are nested with one another during receipt of particles.
Figure 9:
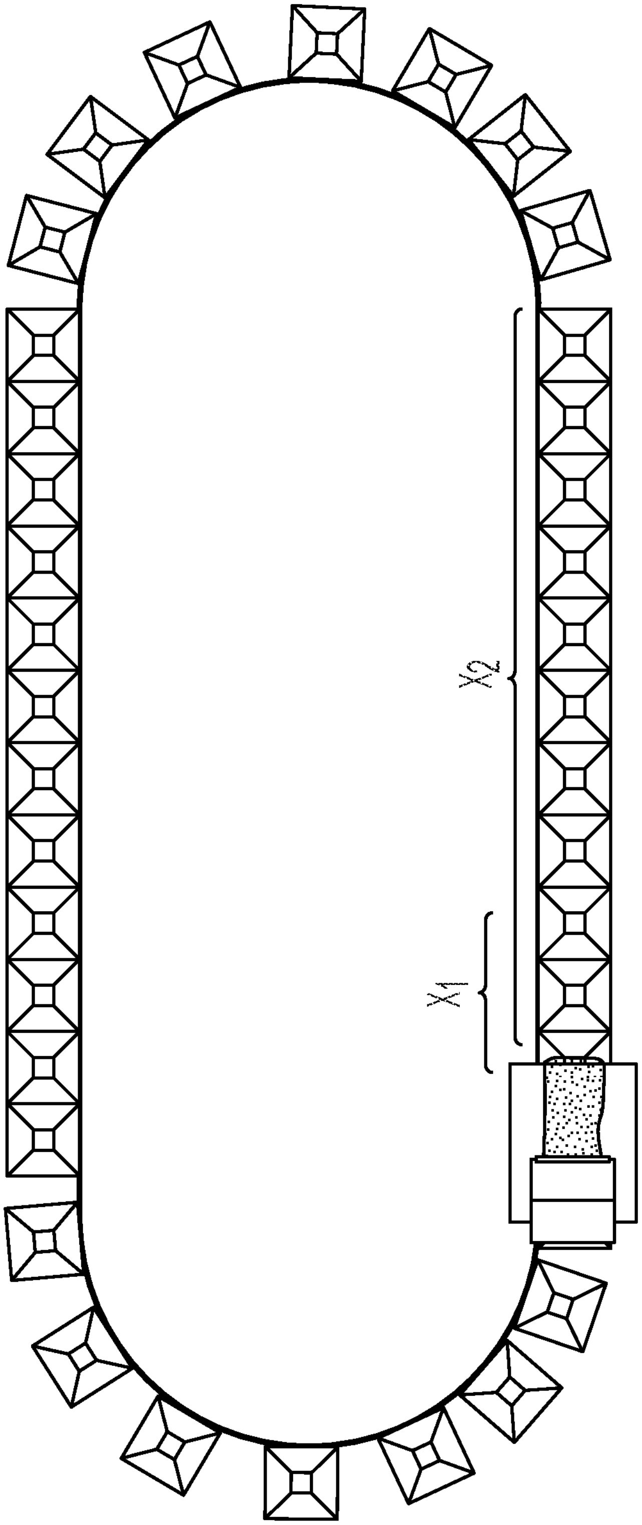
FIG. 9 is top down view of a schematic representation of a process of making a non-fibrous water soluble product where the discretizing unit runs in a loop configuration

A discretizing unit can receive particles and deliver them to a substrate. This delivery can be continuous, intermittent, or a combination thereof. A discretizing unit can include, for example, a pocket and a track. A track can be set-up so at least a portion of one or more pockets travel over at least a portion of a substrate, like a water soluble non-fibrous substrate. In one example, a track is set in a loop, like a circle or an oval (ex. FIG. 9). In this loop configuration, one or more pockets can be in a line and/or side-by-side. A pocket can be nested with an adjacent pocket during all or part of the particle receipt and/or delivery process (see ex. FIG. 7). As a pocket travels along a path, for example by a track, it passes by a feeding system where it receives particles. The one or more pockets may be moving at a constant or variable speed when receiving particles. The one or more pockets may be moving in the machine direction, a cross direction, or any combination thereof. The particles received from the feeding system may be in a continuous stream. The ability to utilize a continuous flow of particles simplifies delivery to a discretizing unit as it does not need a precise line-up of timing between the feeder and the discretizing unit to get the correct amount of particles into a pocket of the unit.

The use of a continuous stream of particles from a feeder can be facilitated by nesting of pockets. Pocket nesting allows for the separation of the continuous particle stream into unit dose amounts in the one or more pockets. Nesting forces particles into a pocket while minimizing any spillage of particles that could arise from a gap between pockets. The nesting of pockets, thus includes, minimizing gaps between adjacent pockets during receipt of particles. This nesting can be accomplished, for example, by having a predefined distance between the adjacent pockets during receipt of particles. This gap could be maintained during multiple phases of the particle application process or adjacent pockets could be moved into position with the predefined gap at any point prior to receipt of particles. Such a gap could be defined based on the particles being received by the pockets (ex. particle size, shape, and/or flowability). Two adjacent pockets could also have no effective gap between them where their adjacent sides are touching.

Another way to nest adjacent pockets during receipt of particles is to utilize a feature of the adjacent pockets, like a flange and/or flashing. Such flange and/or flashing could be positioned to effectively eliminate a gap between the products during particle receipt by the pockets. This flange and/or flashing can overlap at least a portion of the ingress of an adjacent pocket or be positioned to line-up with the edge of an adjacent pocket without overlap.

Figure 5:
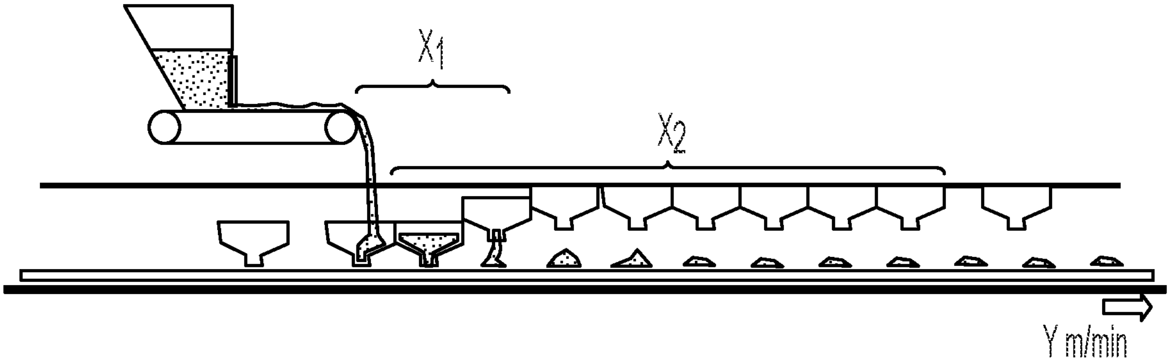
FIG. 5 is a schematic representation of a process of making anon-fibrous water soluble product where a pocket travels toward and contacts a water soluble non-fibrous substrate during application of particles.
Figure 6:
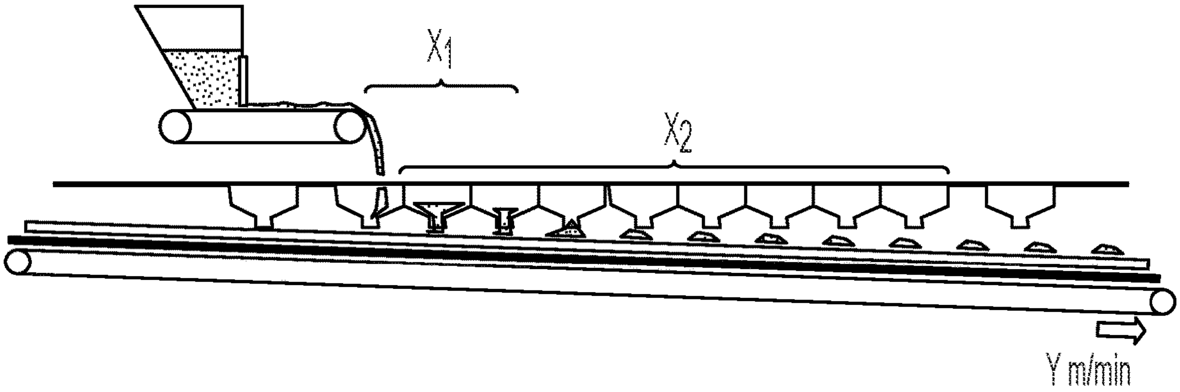
FIG. 6 is a schematic representation of a process of making anon-fibrous water soluble product where a water soluble non-fibrous substrate contacts a pocket during application of particles and then descends away from the pocket.
Figure 8:
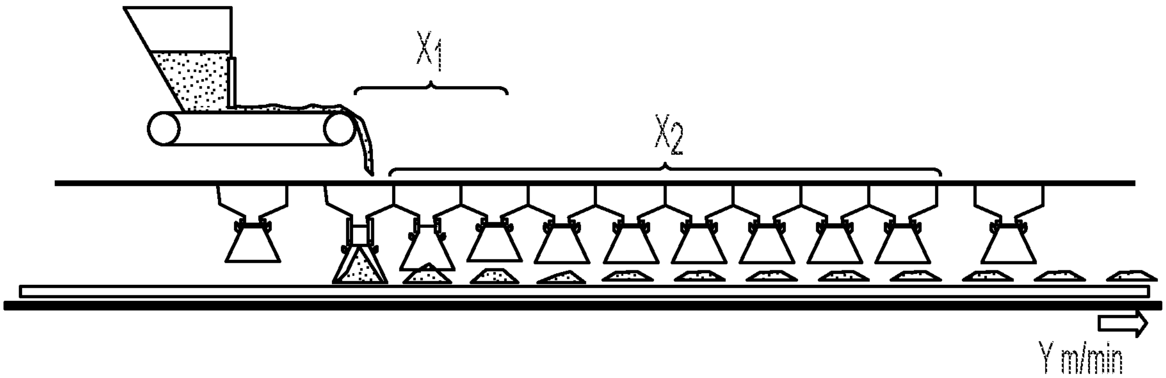
FIG. 8 is a schematic representation of a process of making a non-fibrous water soluble product where at least a portion of a pocket, like a shield, travels toward and contacts a water soluble non-fibrous substrate during application of particles.

Particles may enter a pocket through a pocket ingress and exit through a pocket egress. The height between a substrate and an egress of a pocket may be any desirable height. In addition, this height may be adjustable (see FIGS. 5-6 and 8). For example, a substrate may start at height $H_1$, rise up toward a pocket so that it is at height $H_2$ at the time of particle application. Moreover, a pocket and/or at least a portion of a pocket, like a guard, may start at one height $H_{P1}$ and lower down toward a substrate to a height of $H_{P2}$. At least one of the one or more pockets may move downward toward the substrate to deposit the particles, the substrate may move upward toward the one or more pockets to receive the particles, or a combination thereof. A substrate may be held at a constant distance from the one or more pockets and/or the discretizing unit while underneath them. The moving of a substrate and/or a pocket may done, for example, with a cam and/or positioning of rollers.

Ideally, during particle application at least one pocket of the discretizing unit can travel in sync with the substrate at least during deposition of the particles onto the substrate, though it may also travel in sync with the substrate before and/or after particle application. It is also ideal for at least the portion of the substrate onto which particles are being deposited and the portion of the discretizing unit delivering the particles (ex. an egress of a pocket) are close to one another at the time of particle application to the substrate. In fact, a portion of a pocket, ex. a pocket egress, and/or a guard, can make contact with a substrate during any part of particle application, prior to particle application, after particle application, or any combination thereof. This contact may even result in the depression of the substrate. Touching of the substrate by a pocket and/or guard may help with particle laydown on a substrate by limiting the initial portion of the substrate for delivery to a specific area of the substrate as defined by the portion of the pocket and/or guard that are touching the substrate. Touching also, however, needs coordination in the movement of the pockets (and/or guard) and the substrate which are moving independently otherwise the touching between the pocket (and/or guard) and substrate may cause damage to the substrate.

A substrate can have a target area for particle application and/or laydown. A target area is that portion of the substrate where particle application is desired. The configuration of the travelling mask can impact the ability of the delivered particles to be applied to and stay within a target area. The traveling mask can allow for deposition of about 75% or more, about 80% or more, about 85% or more, about 90% or more, about 95% or more, or most preferably about 97% or more of delivered particles from a pocket to remain within a target area after exiting a discretizing unit, for example a pocket egress, or until the substrate containing the particles is covered and/or sealed. Multiple pockets may deliver particles to the same target area of a substrate.

A discretizing unit or a part of a discretizing unit may deliver particles onto an area of about 20 $mm^2$ to about 10,000 $mm^2$ of the substrate to form a single dose. Once particles are deposited onto a substrate, the side of the substrate comprising the particles may be at least partially covered. This covering may be accomplished by, for example, by folding a portion of the substrate onto itself and/or another substrate(s) may be placed over at least a portion of the substrate with the particles. The substrate(s) may then be sealed around the particles entrapping at least a portion of the particles between the substrate and the covering to form a non-fibrous water soluble product. The sealed pockets of particles may then be cut to separate them from one another and/or extrancous substrate material and packaging for shipping and/or use.

Non-fibrous Water Soluble Product

Figure 2:
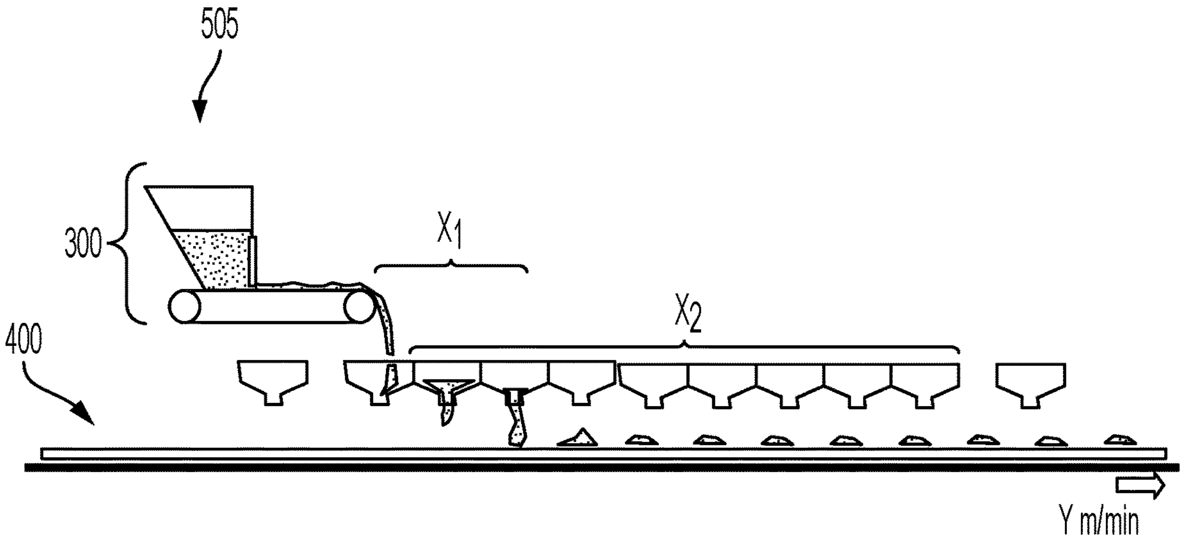
FIG. 2 is a representation of an apparatus for depositing discretized particle doses on a continuous substrate.

A non-fibrous water soluble product can comprise a water soluble non-fibrous substrate. A substrate may be continuous or discrete as shown in FIGS. 1 and 2. The non-fibrous water soluble substrate can be utilized in the formation of a non-fibrous water soluble product which is discussed in more detail below.

A non-fibrous water soluble product can include one or more layers. These layers may be superposed upon one another. The layers may lay directly upon one another, have particles in between the layers, or combination thereof. Layers of a non-fibrous water soluble product can comprise a non-fibrous water soluble substrate, particles, or a combination thereof.

The non-fibrous water-soluble unit dose article may comprise of 50% or greater of bio-based materials, such as for example between 50% and 95% bio-based. Some of the individual components of the non-fibrous water-soluble unit dose article may be fully bio-based to create an article that has a total bio-based content of greater than 50%.

These non-fibrous water-soluble unit dose articles can be dissolved under various wash conditions, e.g., low temperature, low water and/or short wash cycles or cycles where consumers have been overloading the machine, especially with items having high water absorption capacities, while providing sufficient delivery of active agents for the intended effect on the target consumer substrates (with similar performance as today's liquid products).

The surface of the non-fibrous water-soluble unit dose article may comprise a printed area. The printed area may cover between about 10% and about 100% of the surface of the article. The area of print may comprise inks, pigments, dyes, bluing agents or mixtures thereof. The area of print may be opaque, translucent or transparent. The area of print may comprise a single color or multiple colors. The printed area maybe on more than one side of the article and contain instructional text, graphics, etc. The surface of the water-soluble unit dose article may comprise an aversive agent, for example a bittering agent. Suitable bittering agents include, but are not limited to, naringin, sucrose octacetate, quinine hydrochloride, denatonium benzoate, or mixtures thereof. Any suitable level of aversive agent may be used. Suitable levels include, but are not limited to, 1 to 5000 ppm, or even 100 to 2500 ppm, or even 250 to 2000 ppm.

The non-fibrous water-soluble unit dose articles may exhibit a thickness, for example, of greater than 0.01 mm and/or greater than 0.05 mm and/or greater than 0.1 mm and/or to about 100 mm and/or to about 50 mm and/or to about 20 mm and/or to about 10 mm and/or to about 5 mm and/or to about 2 mm and/or to about 0.5 mm and/or to about 0.3 mm.

The non-fibrous water-soluble unit dose articles may have basis weights of from about 500 grams/$m^2$ to about 5,000 grams/$m^2$, or from about 1,000 grams/$m^2$ to about 4,000 grams/$m^2$, or from about 1,500 grams/$m^2$ to about 3,500 grams/$m^2$, or from about 2,000 grams/$m^2$ to about 3,000 grams/$m^2$, or any combination thereof.

The non-fibrous water-soluble unit dose article may exhibit different regions, such as different regions of basis weight, density, caliper, and/or wetting characteristics. The non-fibrous water-soluble unit dose article may be compressed at the point of edge sealing. The non-fibrous water-soluble unit dose article may comprise texture on one or more of its surfaces. A surface of the non-fibrous water-soluble unit dose article may comprise a pattern, such as a non-random, repeating pattern. The non-fibrous water-soluble unit dose article may comprise apertures. The non-fibrous water-soluble unit dose article may comprise a non-fibrous structure having discrete regions of non-fibrous elements that differ from other regions of non-fibrous elements in the structure. The non-fibrous water-soluble unit dose article may be used as is or it may be coated with one or more active agents.

The non-fibrous water-soluble unit dose article may comprise one or more plies. The non-fibrous water-soluble unit dose article may comprise at least two and/or at least three and/or at least four and/or at least five plies. The non-fibrous plies can be non-fibrous structures. Each ply may comprise one or more layers, for example one or more non-fibrous element layers, one or more particle layers, and/or one or more non-fibrous element/particle mixture layers. The layer(s) may be sealed. In particular, particle layers and non-fibrous element/particle mixture layers may be sealed, such that the particles do not leak out. The water-soluble unit dose articles may comprise multiple plies, where each ply comprises two layers, where one layer is a non-fibrous element layer and one layer is a non-fibrous element/particle mixture layer, and where the multiple plies are sealed (e.g., at the edges) together. Sealing may inhibit the leakage of particles as well as help the unit dose article maintain its original structure. However, upon addition of the water-soluble unit dose article to water, the unit dose article dissolves and releases the particles into the wash liquor.

The non-fibrous water-soluble unit dose may be in the form of any three-dimensional structure. The non-fibrous water-soluble unit dose article can be perforated. The article can also be cut or shaped into various sizes for different intended uses. For example, the water-soluble unit dose may be in the form of a square, a rounded square, a kite, a rectangle, a triangle, a circle, an ellipse, and mixtures thereof.

The non-fibrous water-soluble unit dose may comprise less than 10 ingredients. The water-soluble unit dose may comprise between 3 and 9 ingredients, such as, for example, 4 ingredients, 5 ingredients, 6 ingredients, 7 ingredients, or 8 ingredients.

The non-fibrous water-soluble unit dose articles disclosed herein comprise a water-soluble non-fibrous substrate and one or more particles. The non-fibrous substrate may be, for example, a water-soluble film, a foam, a non-woven, or a combination thereof.

The non-fibrous substrate may be a dissolvable foam sheet and may comprise polyvinyl alcohol (PVA) polymer or copolymer thereof as a film-former, a structurant as well as a carrier for any other optional ingredients, like surfactant(s) and other active ingredients (e.g., emulsifiers, builders, chelants, perfumes, colorants, and the like). It is preferred the PVA polymer or copolymer is present in the non-fibrous foam substrate in an amount ranging from about 5% to about 50%, preferably from about 10% to about 40%, preferably from about 15% to about 30%, more preferably from about 20% to about 25%, by total weight of the non-fibrous foam substrate, most preferably the total amount of PVA(s) present in the non-fibrous substrate is no more than 25% by total weight of the substrate.

PVA polymers or copolymers suitable herein are selected those with weight average molecular weights ranging from about 50,000 to about 400,000 Daltons, preferably from about 60,000 to about 300,000 Daltons, more preferably from about 70,000 to about 200,000 Daltons, most preferably from about 80,000 to about 150,000 Daltons. The weight average molecular weight is computed by summing the average molecular weights of each polymer raw material multiplied by their respective relative weight percentages by weight of the total weight of polymers present within the porous solid.

The non-fibrous foam substrate is preferably made by first forming a wet pre-mixture containing the PVA, any surfactant(s) and other optional ingredients, followed by shaping the wet pre-mixture into a sheet and then drying such sheet of wet pre-mixture to form a solidified non-fibrous substrate. Correspondingly, the weight average molecular weight of the PVA polymer or copolymer may affect the overall film-forming properties of the wet pre-mixture and its compatibility/incompatibility with any desired additional ingredients. Further, the weight average molecular weight of the PVA polymer or copolymer used herein may impact the viscosity of the wet pre-mixture, which may in turn influence various physical properties of the resulting non-fibrous substrate so formed.

The PVA polymer or copolymer may further be characterized by a degree of hydrolysis ranging from about 40% to about 100%, preferably from about 50% to about 95%, more preferably from about 70% to about 92%, most preferably from about 80% to about 90%.

The PVA copolymer may include a vinyl alcohol monomer and one or more monomers of any other type. Preferred PVA copolymers can include, in addition to the vinyl alcohol monomer and one or more anionic monomers represented by Formula (I) and/or (II) at below:

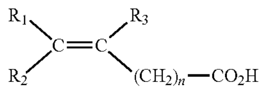

(I)

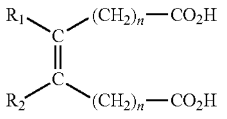

(II)

wherein $R_1$, $R_2$ and $R_3$ are each independently H or methyl, and n is independently an integer of 0 to 3. The above-described anionic monomeric unit, if present, is preferably present in an amount ranging from about 0.5 to about 5 mol %.

Commercially available polyvinyl alcohols include those from Celanese Corporation (Texas, USA) under the CELVOL trade name including, but not limited to, CELVOL 523, CELVOL 530, CELVOL 540, CELVOL 518, CELVOL 513, CELVOL 508, CELVOL 504; those from Kuraray Europe GmbH (Frankfurt, Germany) under the Mowiol® and POVAL™ trade names; and PVA 1788 (also referred to as PVA BP17) commercially available from various suppliers including Lubon Vinylon Co. (Nanjing, China); and combinations thereof. In one example, the nonfibrous substrate comprises from about 10% to about 25%, more preferably from about 15% to about 23%, by total weight of such article, of a polyvinyl alcohol having a weight average molecular weight ranging from 80,000 to about 150,000 Daltons and a degree of hydrolysis ranging from about 80% to about 90%.

In addition to PV As as mentioned hereinabove, a single starch or a combination of starches may be used as a filler material in such an amount as to reduce the overall level of PVAs required, so long as it helps provide non-fibrous substrate with the requisite structure and physical/chemical characteristics as described herein. However, too much starch may comprise the solubility and structural integrity of the non-fibrous article. Therefore, it is preferred the non-fibrous substrate comprises no more than 20%, preferably from 0% to 10%, more preferably from 0% to 5%, most preferably from 0% to 1%, by weight of said solid sheet article, of starch.

A non-fibrous substrate may be a film. Preferred film materials are polymeric materials. The film material can be obtained, for example, by casting, blow-molding, extrusion or blown extrusion of the polymeric material, as known in the art. Preferred polymers, copolymers or derivatives thereof suitable for use herein can comprise polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), or a combination thereof.

Preferably, the level of polymer in the film, for example a PVA polymer, is at least 60%. The polymer can have any weight average molecular weight, preferably from about 1000 to 1,000,000, more preferably from about 10,000 to 300,000 yet more preferably from about 20,000 to 150,000. Mixtures of polymers can also be used as the film. This can be beneficial to control the mechanical and/or dissolution properties of the compartments or film, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000-40,000, preferably around 20,000, and of PVA or copolymer thereof, with a weight average molecular weight of about 100,000 to 300,000, preferably around 150,000.

Also, suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol. Preferred for use herein are polymers which are from about 60% to about 98% hydrolysed, preferably about 80% to about 90% hydrolysed, to improve the dissolution characteristics of the material.

Naturally, different film material and/or films of different thickness may be employed herein. A benefit in selecting different films is that the resulting products and/or compartments may exhibit different solubility or release characteristics.

Most preferred film materials are PVA films known under the MonoSol trade reference M8630, M8900, H8779 and those described in U.S. Pat. Nos. 6,166,117 and 6,787,512 and PVA films of corresponding solubility and deformability characteristics, incorporated herein by reference.

The film material herein can also comprise one or more additive ingredients. For example, it can be beneficial to add plasticizers, for example glycerol, ethylene glycol, diethyleneglycol, propylene glycol, sorbitol and mixtures thereof. Other additives include functional detergent additives to be delivered to the wash water, for example organic polymeric dispersants, etc.

Particles

Particles may be incorporated into a fibrous water soluble product as discussed above, at a level of about 0.1 g to about 30 g, for example. The type of particles utilized can be any that are compatible with the manufacturing system. One parameter which can contribute to the success of depositing particles according to this method is the flowability of the particles. The flowability ($f_p$) of particles can be defined as the ratio of consolidation stress (cs) to unconfined yield strength (ys). The larger the $f_p$, the better particles flow. Generally, it is believed that an $f_p<1$ is not flowing, an $f_p>1$ but less than 2 is very cohesive, an $f_p$ of 2 to less than 4 is considered cohesive, an $f_p$ of 4 to less than 10 is considered easy flowing, and an $f_p$ of 10 or more is considered free flowing. For the process described above, particles with an $f_p$ value of about 4 or more are preferred. The level of flowability can be determined by the Flowability Method listed below. Flowability of the particles may be for example, about 1 or more, about 2 or more, about 3 or more, about 4 or more, about 5 or more, about 5 or more, about 6 or more, about 7 or more, about 8 or more, about 9 or more, about 10 or more, to about 1000 or less. The particles may be a powder, granule, agglomerate, encapsulate, microcapsule, and/or prill. The particles may be made using a number of well-known methods in the art, such as spray-drying, agglomeration, extrusion, prilling, encapsulation, pastillation, and combinations thereof. The shape of the particles can be in the form of spheres, rods, plates, tubes, squares, rectangles, discs, stars, fibers or have regular or irregular random forms. The particles may have a D50 particle size of from about 100 μm to about 1600 μm.

The particles may include a mixture of chemically different particles, such as: surfactant particles, including surfactant agglomerates, surfactant extrudates, surfactant needles, surfactant noodles, surfactant flakes; phosphate particles; zeolite particles; silicate salt particles, especially sodium silicate particles; carbonate salt particles, especially sodium carbonate particles; polymer particles such as carboxylate polymer particles, cellulosic polymer particles, starch particles, polyester particles, polyamine particles, terephthalate polymer particles, polyethylene glycol particles; aesthetic particles such as colored noodles, needles, lamellae particles and ring particles; enzyme particles such as protease granulates, amylase granulates, lipase granulates, cellulase granulates, mannanase granulates, pectate lyase granulates, xyloglucanase granulates, bleaching enzyme granulates and co-granulates of any of these enzymes, these enzyme granulates may comprise sodium sulphate; bleach particles, such as percarbonate particles, especially coated percarbonate particles, such as percarbonate coated with carbonate salt, sulphate salt, silicate salt, borosilicate salt, or any combination thereof, perborate particles, bleach activator particles such as tetra acetyl ethylene diamine particles and/or alkyl oxybenzene sulphonate particles, bleach catalyst particles such as transition metal catalyst particles, and/or isoquinolinium bleach catalyst particles, pre-formed peracid particles, especially coated pre-formed peracid particles; filler particles such as sulphate salt particles and chloride particles; clay particles such as montmorillonite particles and particles of clay and silicone; flocculant particles such as polyethylene oxide particles; wax particles such as wax agglomerates; silicone particles, brightener particles; dye transfer inhibition particles; dye fixative particles; perfume particles such as perfume microcapsules and starch encapsulated perfume accord particles, or pro-perfume particles such as Schiff base reaction product particles; hueing dye particles; chelant particles such as chelant agglomerates; and any combination thereof.

Combinations

1. A method of manufacturing a water soluble product comprising particles, comprising: a) providing a first continuous water soluble non-fibrous substrate comprising a first side moving in a first direction, b) providing a discretizing unit comprising one or more pockets, wherein the one or more pockets have an ingress and an egress, c) providing a first feed of first particles to the ingress of at least one of the one or more pockets; d) delivering the first particles from the egress of the one or more pockets of the discretizing unit onto at least a portion of the first side of the first continuous water soluble non-fibrous substrate; e) at least partially covering the first side of the first continuous water soluble non-fibrous substrate with a covering.

2. A method of manufacturing a water soluble product comprising particles, comprising: a) providing a first continuous water soluble non-fibrous substrate moving in a first direction, b) providing a discretizing unit comprising one or more pockets, wherein the one or more pockets have an ingress and an egress, c) providing a feed of first particles to the ingress of at least one of the one or more pockets; d) delivering the first particles from the egress of the one or more pockets of the discretizing unit onto a portion of a first side of the first continuous water soluble non-fibrous substrate; wherein the at least one of the one or more pockets receiving the first particles is nested with an adjacent pocket while receiving the first particles.

2a. The method of claim 2, further comprising at least partially covering the first side of the first continuous water soluble non-fibrous substrate with a covering.

3. The method of any one of 1 or 2a, further comprising sealing the first continuous water soluble non-fibrous substrate and the covering entrapping at least a portion of the first particles between the first water soluble substrate and the covering, wherein the covering comprises a second non-fibrous water soluble substrate.

4. The method of any one of 1-3, wherein the first particles are delivered to a target area on the first side of the first continuous water soluble substrate and at least 75%, about 80% or more, about 85% or more, about 90% or more, about 95% or more, or most preferably about 97% or more of the first particles stay on the target area upon exiting the discretizing unit.

5. The method of 4, wherein multiple pockets provide particles to the target area.

6. The method of any one of 1-5, further comprising providing a second feed of particles, wherein the second feed of particles may be the same compositionally or different compositionally than the first particles and the second feed of particles may be delivered to the same one or more pockets as the first feed of particles or different one or more pockets than the first feed of particles.

7. The method of any one of 1-6, wherein the discretizing unit discretizes a continuous flow of the first particles into one or more individual doses, preferably the one or more pockets of the discretizing unit.

8. The method of any one of 1-7, wherein the egress has a smaller surface area than the ingress.

9. The method of any one of 1-8, wherein at least one pocket of the discretizing unit travels in sync with the first continuous water soluble non-fibrous substrate during deposition of the particles onto the first continuous water soluble non-fibrous substrate.

10. The method of any one of 1-9, wherein the first continuous water soluble non-fibrous substrate is moving in the first direction at about 5 m/min to about 100 m/min.

11. The method of any of 1-10, wherein the first particles are delivered intermittently from the discretizing unit, preferably from the one or more pockets of the discretizing units.

12. The method of any of 1-11, wherein the particles have a flowability of about 1 or more, about 2 or more, about 3 or more, about 4 or more, about 5 or more, about 5 or more, about 6 or more, about 7 or more, about 8 or more, about 9 or more, about 10 or more, to about 1000 or less.

13. The method of any of 1-12, wherein the particles are delivered from the discretizing unit into an area of about 20 $mm^2$ to about 10,000 $mm^2$ of the first continuous substrate to form a single dose.

14. The method of any of 1-13, wherein the distance from pocket egress to the first water soluble non-fibrous substrate during the delivery of the first particles is from 0 to about 50 mm.

15. The method of any of 1-14, wherein at least two adjacent pockets are nested while receiving the first particles.

16. The method of 15, wherein at least one of the adjacent pockets comprises a flashing on a side of the pocket closest to the adjacent pocket which overlaps a portion of the ingress of the adjacent pocket.

17. The method of any of 1-16, wherein the one or more pockets move in the first direction, at a constant speed while receiving particles, or a combination thereof.

18. The method of any of 1-17, wherein the first water soluble non-fibrous substrate is held at a constant distance from the discretizing unit while underneath the discretizing unit.

19. The method of any of 1-17, wherein at least one of the one or more pockets move downward toward the first water soluble non-fibrous substrate to deposit the first particles, the first water soluble non-fibrous substrate moves upward toward the one or more pockets to receive the first particles, or a combination thereof.

20. The method of any of claims 1-19, wherein the one or more pockets move in a loop.

21. The method of any of claims 1-20, wherein the water soluble non-fibrous web comprises a foam, a film, a non-woven, or a combination thereof.

The Patent Specification should printed with the reference(s) to the nonexistent claim(s).

FLOWABILITY METHOD

The following comparative test is carried out to demonstrate the flowability of particles at ambient temperature and humidity The device adapted for this test is a commercially available flowability testing system, Flodex™ (Teledyne Hanson Research, Chatsworth, Calif., USA), which contains a flat bottom cylindrical hopper with a removable bottom and a set of interchangeable bottom disks containing therein orifices of different sizes. Further, additional bottom disks with orifices of smaller sizes (with diameters below 4 mm) are made so as to provide a more complete range of orifice diameters including 3 mm, 3 mm, 4 mm, 5 mm, 6 mm, 7 mm, 8 mm, 9 mm, 10 mm, 12 mm, 14 mm, 16 mm, 18 mm until 34 mm.

The Flodex™ equipment includes a funnel for loading a particulate test sample into a stainless-steel flat-bottom cylindrical hopper having a diameter of about 5.7 cm. The hopper has a removable bottom defined by a removal bottom disk with an orifice of a specific size therein. Multiple removal bottom disks having orifices of different sizes are provided, as mentioned hereinabove, which can be interchangeably fit at the bottom of hopper in place of disk to thereby define a bottom orifice of a different size. A discharge gate is placed immediately underneath the orifice and above a receiver. When the flowability measurement starts, the discharge gate is moved so as to expose the bottom orifice and allow the particulate test sample to flow from the hopper through the bottom orifice down to the receiver.

To test the flowability of a specific test sample, the following steps are followed:

a. Fill the hopper by pouring about 75 ml of the test sample through funnel. This corresponds to a roughly 1" (25 mm) layer of powder in the cylindrical hopper.
b. After the sample settles for 30 seconds, open the spring-loaded discharge gate and allow the sample to flow through the orifice into the receiver.
c. Steps (a) and (b) are repeated for the same test sample using different bottom disks having orifices of gradually increasing orifice sizes. At the beginning when the bottom disks with relatively smaller orifices are used, the flow of the test sample typically stops at some point due to jamming, i.e., it cannot pass through the orifice due to the small orifice size. Once the flow of test sample stops, a jam is declared, and the specific bottom disk causing the jam is removed and replaced by another bottom disk with an orifice that is slightly larger for another repeat of steps (a) and (b). When the test sample is able to flow completely through an orifice of a specific size for three (3) consecutive times without jamming, such orifice size is recorded as the Flodex™ Blockage Parameter and B refers to the diameter of the orifice in the Flow Disk used in the test. The smaller the Flodex™ Blockage Parameter, the better the flowability of the test sample (i.e., it can flow through smaller orifices without jamming).

Flowability is then calculated according to the following equation:

$$ffc = \frac{H(\theta')\cdot A\cdot\left(1-e^{\frac{K\cdot tan(\phi')\cdot U\cdot h}{A}}\right)}{B\cdot K\cdot \tan(\phi')\cdot U},$$

where H(θ')=(130°−θ')/65° is the hopper flow function as proposed by Jenike, θ' is the internal flow-channel angle in the powder, A is the cross-sectional area of the Flodex™, U is the perimeter of the Flodex™, K is the lateral stress ratio proposed by Janssen, ϕ' is the wall friction coefficient between the powder and the side wall of the steel cylinder, B is the critical diameter of blockage in the Flodex™ (in units mm), and h is the fill height of powder in the Flodex™ (in units mm). After inserting the values for Flodex™ geometry and reasonable values for powder in a flat-bottom steel hopper (K=0.4, θ'=10°, ϕ'=20°), the equation simplifies to:

$$ffc = \frac{210.8\cdot\left(1-e^{-0.0102h}\right)}{B}$$

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A method of manufacturing a water soluble product comprising particles, comprising:

a) providing a first continuous water soluble non-fibrous substrate comprising a first side moving in a first direction,
b) providing a continuous discretizing unit track loop comprising one or more pockets, wherein the one or more pockets have an ingress and an egress,
c) providing a first feed of first particles to the ingress of at least one of the one or more pockets;
d) delivering the first particles from the egress of the one or more pockets of the discretizing unit onto at least a portion of the first side of the first continuous water soluble non-fibrous substrate;
e) at least partially covering the first side of the first continuous water soluble non-fibrous substrate with a covering.

2. The method of claim 1, further comprising sealing the first continuous water soluble non-fibrous substrate and the covering entrapping at least a portion of the first particles between the first water soluble substrate and the covering, wherein the covering comprises a second non-fibrous water soluble substrate.

3. The method of claim 1, wherein the first particles are delivered to a target area on the first side of the first continuous water soluble substrate and at least 75% of the first particles stay on the target area upon exiting the discretizing unit.

4. The method of claim 3, wherein multiple pockets provide particles to the target area.

5. The method of claim 1, further comprising providing a second feed of particles, wherein the second feed of particles may be the same compositionally or different compositionally than the first particles and the second feed of particles may be to the same one or more pockets as the first feed of particles or different one or more pockets than the first feed of particles.

6. The method of claim 1, wherein the discretizing unit discretizes a continuous flow of the first particles into one or more individual doses.

7. The method of claim 1, wherein the egress has a smaller surface area than the ingress.

8. The method of claim 1, wherein at least one pocket of the discretizing unit travels in sync with the first continuous water soluble non-fibrous substrate during deposition of the particles onto the first continuous water soluble non-fibrous substrate.

9. The method of claim 8, wherein the first continuous water soluble non-fibrous substrate is moving in the first direction at about 5 m/min to about 100 m/min.

10. The method of claim 1, wherein the first particles are delivered intermittently from the discretizing unit.

11. The method of claim 1, wherein the particles have a flowability of about 1 or more.

12. The method of claim 1, wherein the first water soluble non-fibrous substrate comprises a film, a foam, a non-woven, or a combination thereof.

13. The method of claim 12, wherein the distance from pocket egress to the first water soluble non-fibrous substrate during the delivery of the first particles is from 0 to about 50 mm.

14. The method of claim 1, wherein at least two adjacent pockets are nested while receiving the first particles.

15. The method of claim 14, wherein at least one of the adjacent pockets comprises a flashing on a side of the pocket closest to the adjacent pocket which overlaps a portion of the ingress of the adjacent pocket.

16. The method of claim 1, wherein the one or more pockets move in the first direction, at a constant speed while receiving particles, or a combination thereof.

17. The method of claim 1, wherein the first water soluble non-fibrous substrate is held at a constant distance from the discretizing unit while underneath the discretizing unit.

18. The method of claim 1, wherein at least one of the one or more pockets move downward toward the first water soluble non-fibrous substrate to deposit the first particles, the first water soluble non-fibrous substrate moves upward toward the one or more pockets to receive the first particles, or a combination thereof.

19. A method of manufacturing a water soluble product comprising particles, comprising:

a) providing a first continuous water soluble non-fibrous substrate moving in a first direction, b) providing a continuous discretizing unit track loop comprising one or more pockets, wherein the one or more pockets have an ingress and an egress, c) providing a feed of first particles to the ingress of at least one of the one or more pockets;

d) delivering the first particles from the egress of the one or more pockets of the discretizing unit onto a portion of a first side of the first continuous water soluble non-fibrous substrate;

wherein the at least one of the one or more pockets receiving the first particles is nested with an adjacent pocket while receiving the first particles.

* * * * *